United States Patent
Torre

(10) Patent No.: US 9,918,571 B2
(45) Date of Patent: Mar. 20, 2018

(54) MODULAR FOOD SERVICE SYSTEM AND METHOD

(71) Applicant: Salvatore Torre, Lafayette, NJ (US)

(72) Inventor: Salvatore Torre, Lafayette, NJ (US)

( * ) Notice: Subject to any disclaimer, the term of this patent is extended or adjusted under 35 U.S.C. 154(b) by 0 days.

(21) Appl. No.: 15/334,661

(22) Filed: Oct. 26, 2016

(65) Prior Publication Data
US 2017/0172324 A1   Jun. 22, 2017

Related U.S. Application Data

(60) Provisional application No. 62/270,650, filed on Dec. 22, 2015.

(51) Int. Cl.
| A47F 3/14 | (2006.01) |
| A47F 7/00 | (2006.01) |
| A47F 10/06 | (2006.01) |
| A47J 36/24 | (2006.01) |
| A47F 3/04 | (2006.01) |

(52) U.S. Cl.
CPC ............. *A47F 10/06* (2013.01); *A47F 3/0439* (2013.01); *A47F 3/14* (2013.01); *A47F 7/0071* (2013.01); *A47J 36/24* (2013.01)

(58) Field of Classification Search
CPC .......... A47F 10/06; A47F 3/0439; A47F 3/14; A47F 7/0071; A47F 3/0456; A47F 5/0025; A47F 3/04; A47F 3/0413; A47F 7/146; A47F 5/0018; A47F 7/147; A47J 36/24; A47J 36/2405; A47J 36/34; A47B 88/969; A47B 2008/976; A47B 88/988; A47B 88/994; A47B 2088/205; A47B 87/0261; A47B 87/008; A47B 87/02; A47B 63/00

USPC ....... 211/85.4, 10, 126.2, 126.3; 62/258, 246, 62/251, 252; 312/348.3, 117, 128, 137, 312/114

See application file for complete search history.

(56) References Cited

U.S. PATENT DOCUMENTS

| 803,102 | A | * | 10/1905 | Harris | ..................... | A47B 31/00 |
| | | | | | | 16/96 R |
| 2,894,604 | A | * | 7/1959 | McMillan | ............... | A47J 36/26 |
| | | | | | | 186/44 |
| 3,800,939 | A | | 4/1974 | Cornelius | | |
| 3,834,778 | A | * | 9/1974 | Morrison | .............. | A61J 7/0069 |
| | | | | | | 211/126.3 |
| 4,131,203 | A | * | 12/1978 | Bridges | ................. | A47F 5/0025 |
| | | | | | | 108/32 |
| 4,274,391 | A | * | 6/1981 | Karapetian | ............. | A47J 27/06 |
| | | | | | | 126/33 |
| 4,407,143 | A | | 10/1983 | Wolfe | | |
| 4,782,665 | A | | 11/1988 | Wolfe | | |

(Continued)

*Primary Examiner* — Jennifer E. Novosad
(74) *Attorney, Agent, or Firm* — Arthur Jacob

(57) ABSTRACT

A food service system and method for dispensing contents, display the contents within a matrix of food pans suspended within a well member of the food service system. Each food pan is provided with a brim having an upper area extending transverse with respect to a stop element that establishes a dam enabling the contents of the food pan to spread over the corresponding upper area, while confined by the dam at the stop element. Corresponding stop elements of adjacent food pans are placed contiguous with one-another. In this manner, a display and dispensing area of the contents of each food pan is expanded to extend over the upper area of the brim of that food pan and is in close proximity with the display and dispensing area of adjacent food pans so as to enhance the display of the contents to be dispensed at the matrix of food pans within the food service system.

8 Claims, 3 Drawing Sheets

(56) References Cited

U.S. PATENT DOCUMENTS

| | | | | |
|---|---|---|---|---|
| 4,794,228 | A * | 12/1988 | Braun, Jr. | A47J 27/004 |
| | | | | 126/33 |
| 4,802,340 | A * | 2/1989 | Johnson | A47F 3/0452 |
| | | | | 62/229 |
| 5,182,924 | A * | 2/1993 | Trulaske, Sr. | A47F 3/0443 |
| | | | | 62/255 |
| 5,363,672 | A * | 11/1994 | Moore | A47F 3/0491 |
| | | | | 165/918 |
| 5,551,774 | A | 9/1996 | Campbell et al. | |
| 6,000,236 | A * | 12/1999 | Haasis | A47F 3/0413 |
| | | | | 62/258 |
| 6,385,990 | B1 * | 5/2002 | Lee | A47F 3/0408 |
| | | | | 62/258 |
| 6,612,124 | B1 * | 9/2003 | Hatch | A47F 10/06 |
| | | | | 220/661 |
| 6,735,971 | B2 * | 5/2004 | Monroe | A47F 10/06 |
| | | | | 62/258 |
| 8,443,616 | B2 * | 5/2013 | Cullen | A47F 3/0439 |
| | | | | 62/258 |
| 9,038,846 | B2 * | 5/2015 | Ottenwalder | A47G 23/04 |
| | | | | 220/574.2 |
| 9,284,776 | B2 * | 3/2016 | Bond | A47B 13/00 |
| 2002/0020304 | A1 * | 2/2002 | Reynolds | A47J 36/24 |
| | | | | 99/339 |
| 2007/0062926 | A1 * | 3/2007 | Lee | A47J 36/24 |
| | | | | 219/400 |
| 2007/0079822 | A1 * | 4/2007 | Pickens | A47J 36/24 |
| | | | | 126/33 |
| 2010/0293979 | A1 | 11/2010 | Shei et al. | |
| 2017/0172324 | A1 * | 6/2017 | Torre | A47F 10/06 |

\* cited by examiner

MODULAR FOOD SERVICE SYSTEM AND METHOD

This application claims the benefit of U.S. Provisional Patent Application Ser. No. 62/270,650, filed Dec. 22, 2015, the subject matter of which is incorporated herein by reference thereto.

The present invention relates generally to the presentation of food at a service location and pertains, more specifically, to a modular system of food pans arranged to display and dispense condiments and the like at a food dispensing location.

A wide variety of food service bars and the like currently are available for displaying and dispensing food at locations where the food items are maintained at a desired temperature while presented for selection. Various condiments and the like are contained within open pans suspended over heating or cooling arrangements to maintain the food at the desired temperature while still being offered in a conveniently accessible, aesthetically appealing presentation.

The present invention provides a modular system of food service pans that accomplishes the above-outlined objectives, as well as further objects and advantages which may be summarized as follows: Enables a selected number of food pans to be arranged and suspended within a common well member for an aesthetic presentation while being heated or cooled to maintain a desired temperature; maximizes use of the area and volume available at a given well member for the effective and efficient display and dispensing of a selected variety of foods, such as condiments and the like, in a matrix of food pans in a selected number fitted to the dimensions available at the site; provides an enhanced, aesthetically pleasing display of foods offered in adjacent food pans at a dispensing location while maintaining an effective and sanitary division between adjacent displayed food items; enables ease and versatility in selecting and displaying any selected one of a plurality of food pan assemblies within a matrix placed in an available common well member; maintains a high degree of integrity among food pans assembled within a matrix placed in a common well member, while attaining a maximum display and dispensing area of effectively divided individual food locations; provides a simple and economical construction capable of effective service over an extended service life.

The above objects and advantages, as well as further objects and advantages, are attained by the present invention which may be described briefly as a food pan for displaying contents to be dispensed in a food service system in which the food pan is suspended within a well member, the food pan comprising: a bottom wall; a peripheral side wall including an upper edge spaced upwardly from the bottom wall, the peripheral side wall establishing an interior for containing the contents with a display and dispensing area of the contents juxtaposed with the upper edge; a peripheral brim extending transverse to the peripheral side wall, in juxtaposition with the upper edge, the peripheral brim terminating at a peripheral outer boundary spaced laterally from the peripheral side wall; and a peripheral stop element projecting upwardly from the peripheral brim, adjacent the peripheral outer boundary, the peripheral stop element establishing a dam surrounding an upper area of the peripheral brim such that contents, upon being placed within the interior volume of the food pan, will be spread over the peripheral brim and confined by the dam at the peripheral stop element, thereby extending the display and dispensing area of the contents over the upper area of the brim.

In addition, the present invention provides a food service system in which food pans display contents to be dispensed in the food service system, the food service system comprising: a well member; a plurality of food pans, each food pan comprising a bottom wall; a peripheral side wall including an upper edge spaced upwardly from the bottom wall, the peripheral side wall establishing an interior for containing contents with a display and dispensing area of the contents juxtaposed with the upper edge; a peripheral brim extending transverse to the peripheral side wall, in juxtaposition with the upper edge, the peripheral brim terminating at a peripheral outer boundary spaced laterally from the peripheral side wall; and a peripheral stop element projecting upwardly from the peripheral brim, coextensive with the peripheral outer boundary, the peripheral stop element establishing a dam surrounding an upper area of the peripheral brim such that contents, upon being placed within the interior volume of the food pan, will be spread over the peripheral brim and confined by the dam at the peripheral stop element, thereby extending the display and dispensing area of the contents over the upper area of the brim; whereby upon suspension of the plurality of food pans in a matrix of food pans within the well member, corresponding stop members of adjacent food pans of the matrix of food pans are located contiguous with one-another, thereby placing corresponding display and dispensing areas of adjacent food pans in close proximity for enhanced display and dispensing.

Further, the present invention includes a method for displaying contents within food pans in a food service system in which the food pans are suspended within a well member to display the contents to be dispensed at the food service system, the method comprising: providing a plurality of food pans, each food pan comprising a bottom wall; a peripheral side wall including an upper edge spaced upwardly from the bottom wall, the peripheral side wall establishing an interior for containing contents with a display and dispensing area of the contents juxtaposed with the upper edge; a peripheral brim extending transverse to the peripheral side wall, in juxtaposition with the upper edge, the peripheral brim terminating at a peripheral outer boundary spaced laterally from the peripheral side wall; and a peripheral stop element projecting upwardly from the peripheral brim, coextensive with the peripheral outer boundary, the peripheral stop element establishing a dam surrounding an upper area of the peripheral brim such that contents, upon being placed within the interior of the food pan, will be spread over the peripheral brim and confined by the dam at the peripheral stop element, thereby extending the display and dispensing area of the contents over the upper area of the brim; suspending the plurality of food pans in a matrix of food pans within the well member; and placing corresponding stop members of adjacent food pans of the matrix of food pans contiguous with one-another, thereby placing corresponding display and dispensing areas of adjacent food pans in close proximity for enhanced display and dispensing.

The present invention will be understood more fully, while further objects and advantages will become apparent, in the following detailed description of preferred embodiments of the invention illustrated in the accompanying drawing, in which.

Figure 1:
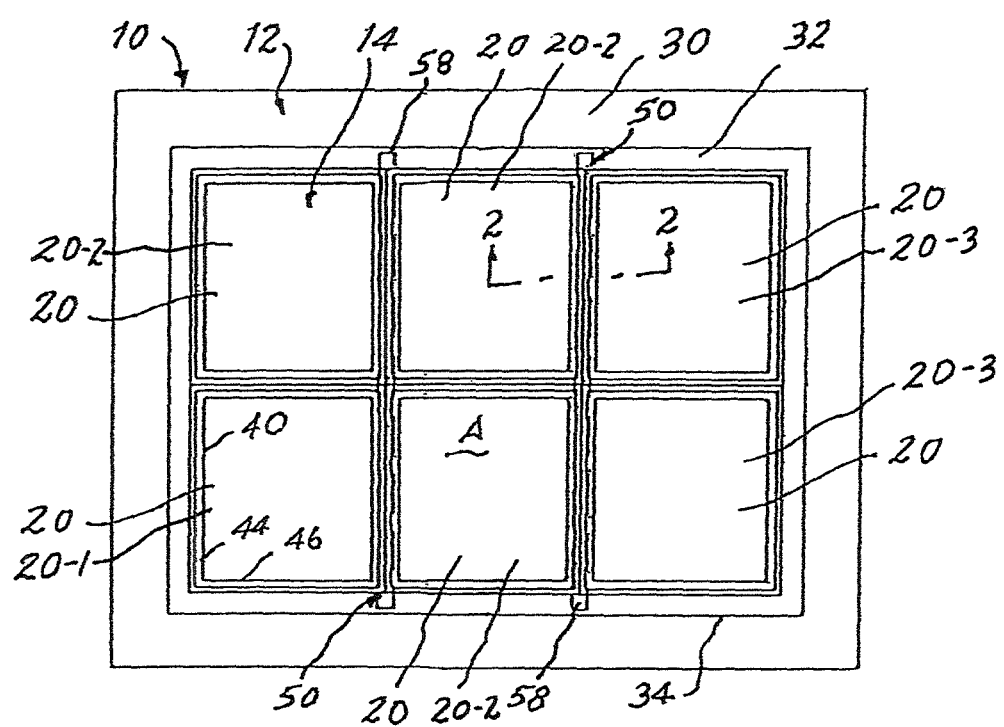
FIG. 1 is a top plan view of a modular food service system constructed in accordance with the present invention.
Figure 2:
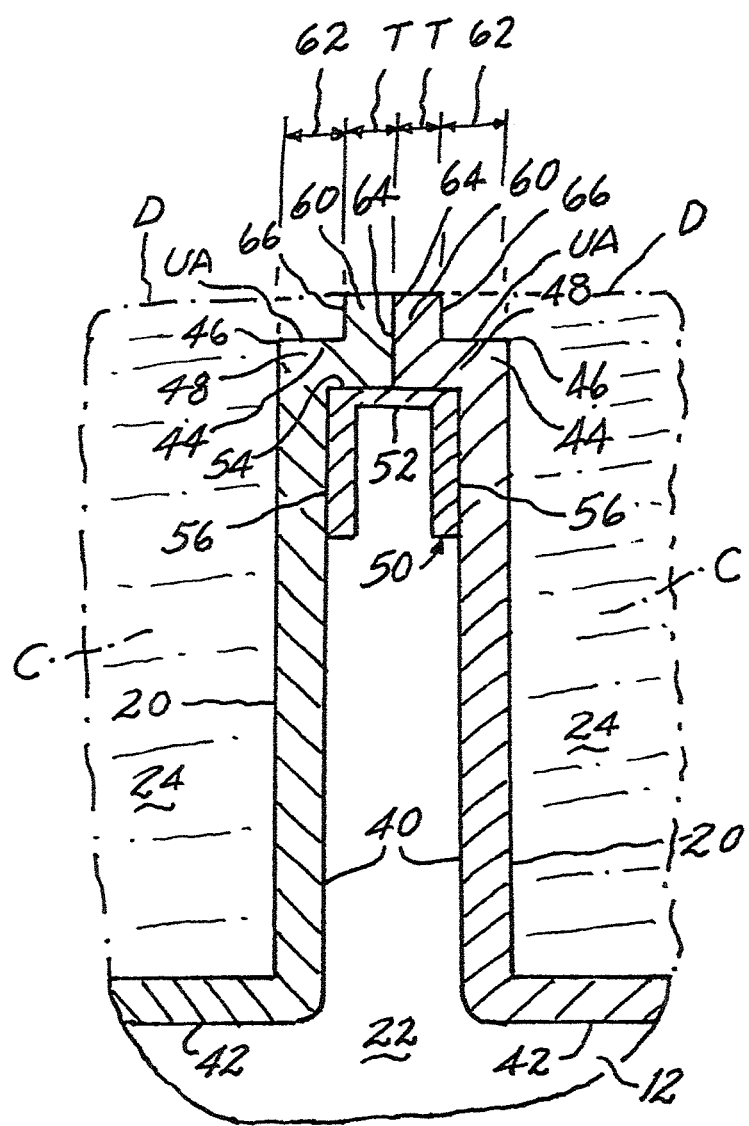
FIG. 2 is an enlarged, fragmentary cross-sectional view taken along line 2-2 of FIG. 1.

Referring now to the drawing and, in particular, to FIGS. 1 and 2 thereof, a modular food service system constructed in accordance with the present invention is shown at 10 and is seen to include a well member 12 within which there is suspended a matrix 14 of food pans shown in the form of condiment pans 20. In a now-conventional manner, condiment pans 20 can be heated or cooled to a desired temperature by means (not shown) provided within well member 12. To that end, each pan 20 is constructed of a material, such as aluminum or stainless steel, that will conduct heat between the interior 22 of well member 12 and the interior 24 of each pan 20. Other materials are feasible, in particular, synthetic polymeric materials, one example of which is melamine.

Well member 12 includes a flange 30 extending peripherally around a perimetric cleat 32 which, in turn, surrounds the interior 22 and presents an opening 34 adjacent the top 36 of well member 12, opening 34 having a given length and width establishing an area A for the presentation of condiments to be contained in pans 20. In the illustrated example, six pans 20 are placed in matrix 14 for presenting a variety consisting of six different condiments, each pan 20 extending over one-sixth of area A. Each pan 20 includes a peripheral side wall 40 extending upwardly from and essentially normal to a bottom wall 42 and terminating at a peripheral rim 44 at the upper edge 46 of each wall 40. Rim 44 extends transverse with respect to side wall 40 so that a peripheral brim 48 of rim 44 will rest upon cleat 32 to support a corresponding pan 20 in place within matrix 14.

Figure 3:
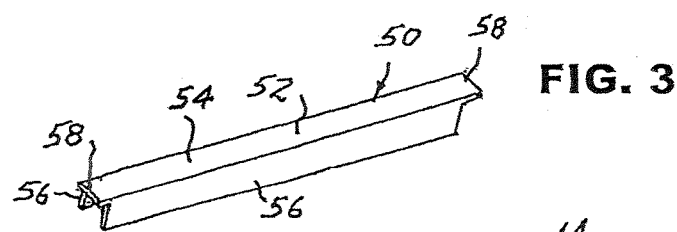
FIG. 3 is a pictorial view of a component part of the modular system.
Figure 4:
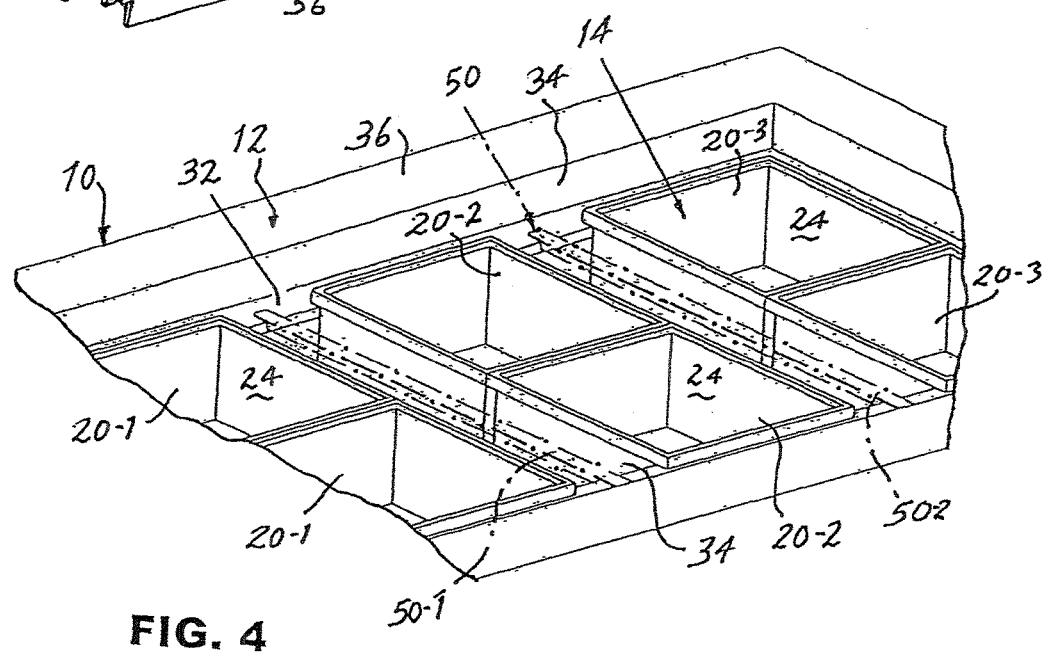
FIG. 4 is an enlarged, somewhat diagrammatic, fragmentary exploded pictorial view of a portion of the modular system, in one selected configuration.

In order to adapt area A to accommodate the six pans 20 in matrix 14, selectively inserted or removed adapter bars 50 are extended across the width of opening 34 to provide added support for each pan 20. With reference to FIGS. 3 and 4, as well as to FIGS. 1 and 2, each adapter bar 50 includes an upper section 52 that provides a platform 54 upon which a brim 48 of a peripheral rim 44 can rest, while reinforcing sections 56 depend from platform 54 to lend rigidity for supporting a pan 20. An integral tab 58 extends from each end of upper section 52 to engage and rest upon a corresponding portion of cleat 32 when an adapter bar 50 is in place between adjacent pans 20. Thus, as illustrated in FIGS. 1 through 4, a first row made up of pans 20-1 is supported by cleat 32 and adapter bar 50-1, while a second row made up of pans 20-2 is supported by cleat 32 and adapter bars 50-1 and 50-2, and a third row made up of pans 20-3 is supported by cleat 32 and adapter bar 50-2.

As best seen in FIG. 2, each peripheral rim 44 includes an integral stop element 60 projecting upwardly from and essentially normal to brim 48 and spaced outwardly by a space 62. Stop elements 60 of adjacent pans 20 are contiguous and abut one another to secure each pan 20 in place within matrix 14, while keeping cleat 32 and adapter bars 50 hidden and thereby establishing a pleasing aesthetic presentation of the contents C of each pan 20. Each stop element 60 is coextensive with a peripheral outer boundary 64 of a corresponding peripheral brim 48 and establishes a dam 66 surrounding an upper area UA of the peripheral brim 48 such that contents C, upon being placed within the interior 24 of a pan 20, will be spread over upper area UA of the peripheral brim 48 and confined by dam 66 at peripheral stop element 60, thereby extending a display and dispensing area D of the contents C over upper area UA of the brim 48. At the same time, each stop element 60 is relatively thin, as illustrated by the limited thickness T, thereby bringing the contents C of each pan 20, as shown in phantom, over upper area UA of a corresponding brim 48 and into relatively close proximity, spaced apart by only the total of thicknesses T of the abutting stop elements 60, resulting in an enhanced aesthetic appearance of the matrix 14, by virtue of the expansion of the display and dispensing area D provided by each pan 20, wherein the contents C within each pan 20 extends over the upper area UA of the pan 20.

Figure 5:
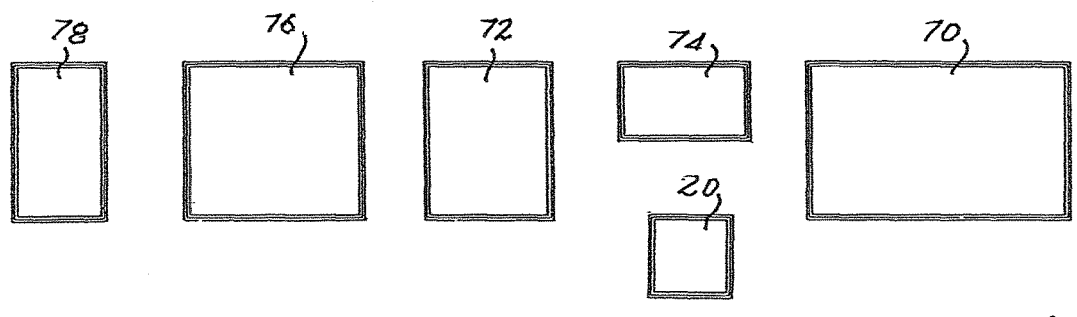
FIG. 5 is a top plan view showing alternate component parts of the modular system.

Referring now to FIG. 5, versatility of the present modular system 10 is illustrated by the provision of alternately selected pans for insertion into corresponding alternate matrixes with a well member of given dimensions. Thus, an end user is given a choice of employing either a full-size pan 70 which is dimensioned to fit area A of the given well member 12, two half-size pans 72, four quarter size pans 74, or a combination of one two-thirds size pan 76 and one one-third size pan 78, as well as the previously-described six-pan arrangement, any of which choices will fill area A with a matrix of fully supported, closely adjacent separately presented condiments, with ease and reliability.

It will be seen that the present invention attains all of the objects and advantages summarized above, namely: Enables a selected number of food pans to be arranged and suspended within a common well member for an aesthetic presentation while being heated or cooled to maintain a desired temperature; maximizes use of the area and volume available at a given well member for the effective and efficient display and dispensing of a selected variety of foods, such as condiments and the like, in a matrix of food pans in a selected number fitted to the dimensions available at the site; provides an enhanced, aesthetically pleasing display of foods offered in adjacent food pans at a dispensing location while maintaining an effective and sanitary division between adjacent displayed food items; enables ease and versatility in selecting and displaying any selected one of a plurality of food pan assemblies within a matrix placed in an available common well member; maintains a high degree of integrity among food pans assembled within a matrix placed in a common well member, while attaining a maximum display and dispensing area of effectively divided individual food locations; provides a simple and economical construction capable of effective service over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A food service system wherein food pans are adapted to be suspended in a matrix of food pans to display contents to be dispensed in the food service system, the food service system comprising:
   a well member;
   a plurality of food pans, each food pan comprising:
   a bottom wall;
   a peripheral side wall including an upper edge spaced upwardly from the bottom wall, the peripheral side wall establishing an interior volume adapted to contain contents such that a display and dispensing area of the contents will be juxtaposed with the upper edge;

a peripheral brim extending transverse to the peripheral side wall, in juxtaposition with the upper edge, the peripheral brim terminating at a peripheral outer boundary spaced laterally from the peripheral side wall; and a peripheral stop element projecting upwardly from the peripheral brim, coextensive with the peripheral outer boundary, the peripheral stop element establishing a dam surrounding an upper area of the peripheral brim such that contents, upon being placed within the interior volume of the food pan, will be spread over the peripheral brim and confined by the dam at the peripheral stop element, thereby extending the display and dispensing area of the contents over the upper area of the peripheral brim;

whereby upon suspension of the plurality of food pans in the well member, in the matrix of food pans within the well member, peripheral stop elements of adjacent food pans of the matrix of food pans will be located contiguous with one-another, thereby placing corresponding display and dispensing areas of adjacent food pans in close proximity for enhanced display and dispensing.

2. The food service system of claim 1 wherein the peripheral side wall of each food pan extends upwardly from the corresponding bottom wall, essentially normal to the corresponding bottom wall.

3. The food service system of claim 2 wherein the peripheral brim of each food pan extends essentially normal to the corresponding peripheral side wall.

4. The food service system of claim 3 wherein the dam of each food pan extends essentially normal to the corresponding peripheral brim.

5. A method for displaying contents within food pans in a food service system wherein the food pans are adapted to be suspended in a matrix of food pans within a well member to display the contents to be dispensed at the food service system, the method comprising:

providing a plurality of food pans, each food pan providing a bottom wall;

a peripheral side wall including an upper edge spaced upwardly from the bottom wall, the peripheral side wall establishing an interior volume adapted to contain contents such that a display and dispensing area of the contents will be juxtaposed with the upper edge;

a peripheral brim extending transverse to the peripheral side wall, in juxtaposition with the upper edge, the peripheral brim terminating at a peripheral outer boundary spaced laterally from the peripheral side wall; and a peripheral stop element projecting upwardly from the peripheral brim, coextensive with the peripheral outer boundary, the peripheral stop element establishing a dam surrounding an upper area of the peripheral brim such that contents, upon being placed within the interior volume of the food pan, will be spread over the peripheral brim and confined by the dam at the peripheral stop element, thereby extending the display and dispensing area of the contents over the upper area of the peripheral brim;

suspending the plurality of food pans in a matrix of food pans within the well member; and placing corresponding peripheral stop elements of adjacent food pans of the matrix of food pans contiguous with one-another, thereby placing corresponding display and dispensing areas of adjacent food pans in close proximity for enhanced display and dispensing.

6. The method of claim 5 including extending the peripheral side wall of each food pan upwardly from the corresponding bottom wall, essentially normal to the corresponding bottom wall.

7. The method of claim 6 including extending the peripheral brim of each food pan essentially normal to the corresponding peripheral side wall.

8. The method of claim 7 including extending the dam of each food pan essentially normal to the corresponding peripheral brim.

\* \* \* \* \*